(12) United States Patent
Jenny et al.

(10) Patent No.: US 10,017,143 B2
(45) Date of Patent: Jul. 10, 2018

(54) SIDE PANEL ARRANGEMENT FOR A VEHICLE AND VEHICLE WITH THE SIDE PANEL ARRANGEMENT

(71) Applicant: GM GLOBAL TECHNOLOGY OPERATIONS LLC, Detroit, MI (US)

(72) Inventors: Thomas Jenny, Alsbach-Hähnlein (DE); Lars Willke, Ingelheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 14/968,081

(22) Filed: Dec. 14, 2015

(65) Prior Publication Data

US 2016/0176377 A1 Jun. 23, 2016

(30) Foreign Application Priority Data

Dec. 20, 2014 (DE) .................. 10 2014 019 316

(51) Int. Cl.
*B60R 21/213* (2011.01)
*B60R 21/215* (2011.01)
*B60R 21/231* (2011.01)

(52) U.S. Cl.
CPC .. *B60R 21/213* (2013.01); *B60R 2021/21537* (2013.01); *B60R 2021/23153* (2013.01)

(58) Field of Classification Search
CPC ................... B60R 21/213; B60R 2021/21537
See application file for complete search history.

(56) References Cited

U.S. PATENT DOCUMENTS

| 5,791,683 | A | 8/1998 | Shibata et al. |
| 6,333,515 | B1 * | 12/2001 | Kubota .............. B60R 13/0206 280/728.1 |
| 6,565,116 | B1 * | 5/2003 | Tajima .............. B60R 13/0206 24/297 |
| 7,172,209 | B2 | 2/2007 | Totani et al. |
| 7,556,284 | B2 | 7/2009 | Riha et al. |
| 7,758,066 | B2 | 7/2010 | Sia et al. |

(Continued)

FOREIGN PATENT DOCUMENTS

| DE | 19739107 C2 | 2/2001 |
| DE | 102006027082 A1 | 12/2007 |

(Continued)

OTHER PUBLICATIONS

Dr. S. Eckard, EP 0921 043 Machine Translation.*

(Continued)

*Primary Examiner* — Karen Beck
(74) *Attorney, Agent, or Firm* — Lorenz & Kopf, LLP (57) ABSTRACT

A side panel arrangement for a vehicle having a cladding arrangement including a first cladding element covering at least one pillar section made from a flexible and/or bendable material, and an airbag module with an inflatable airbag. The airbag module is arranged so as to be concealed behind the first cladding element. A first end side of the first cladding element is configured to border a door opening and to be fastened to the vehicle pillar. The first end side is releasable from the vehicle pillar 4 to create an outlet for the inflating airbag when the airbag module activated, or wherein the outlet for the inflating airbag is created in a base material of the first cladding element.

14 Claims, 9 Drawing Sheets

(56) References Cited

U.S. PATENT DOCUMENTS

| | | | | |
|---|---|---|---|---|
| 9,487,162 B2* | 11/2016 | Inagawa | ............... | B60R 21/213 |
| 2007/0108742 A1* | 5/2007 | Itakura | ................. | B60R 21/213 |
| | | | | 280/728.3 |
| 2007/0296185 A1* | 12/2007 | Hidaka | ................ | B60R 21/213 |
| | | | | 280/728.2 |
| 2016/0068116 A1* | 3/2016 | Inagawa | ............... | B60R 21/213 |
| | | | | 296/193.06 |
| 2016/0368447 A1* | 12/2016 | Sakurai | ............... | B60R 13/0206 |

FOREIGN PATENT DOCUMENTS

| | | | | |
|---|---|---|---|---|
| DE | 102007027323 A1 | 12/2008 | | |
| DE | 102008006905 A1 | 8/2009 | | |
| DE | 10201521508 A1 * | 2/2017 | ............... | B60P 7/08 |
| EP | 0921043 A1 | 6/1999 | | |
| FR | 2985694 A1 * | 7/2013 | ............... | B60R 5/04 |
| GB | 2387580 A | 10/2003 | | |

OTHER PUBLICATIONS

Benkler et al. DE 10 2007 027323 Machine Translation.*
Debusne et Senecal FR 2985694 Machine Translation.*
R. Kurz, DE 10 2006 027082 Machine Translation.*
Wandtke et al. DE 102008041908 A1 ip.com preview May 12, 2010.*
German Patent Office, German Search Report for German Application No. 102014019316.0, dated Apr. 15, 2015.

* cited by examiner

SIDE PANEL ARRANGEMENT FOR A VEHICLE AND VEHICLE WITH THE SIDE PANEL ARRANGEMENT

CROSS-REFERENCE TO RELATED APPLICATIONS

This application claims priority to German Patent Application No. 102014019316.0, filed Dec. 20, 2014, which is incorporated herein by reference in its entirety.

TECHNICAL FIELD

The present disclosure pertains to a side panel arrangement having a cladding arrangement and an airbag module.

BACKGROUND

Many side panel arrangements include vehicle pillars, which are covered with a cladding on the side facing toward the interior of the vehicle. Often, an airbag module with an airbag is arranged behind the cladding arrangement. Cladding arrangements that include a covering device made from a flexible material are generally known. In the event of a collision resulting in the activation of the airbag module, the airbag is inflated through an outlet opening and into the interior of the vehicle. The outlet opening is arranged in the vicinity of the cladding element made from a flexible material.

For example, U.S. Pat. No. 7,758,066 B2 describes a rear pillar cladding arrangement that covers an airbag on a rear pillar of the vehicle. The rear pillar cladding arrangement includes a base cladding element with flexible covering, which is connected to a front section of the base cladding element. When the airbag is activated, the airbag separates the flexible covering from the front portion of the base cladding element as it inflates, so that the airbag can expand into an interior space of the vehicle. The flexible covering remains attached to the base cladding element, so that it is not propelled into the interior of the vehicle.

SUMMARY

In accordance with the present disclosure, a functionally improved and visually attractive side panel arrangement for a motor vehicle is provided. A side panel arrangement for a motor vehicle having a vehicle side panel with a door opening. The door opening is preferably integrated so that a vehicle door can be inserted in the vehicle side panel. In particular, the door opening is an opening for a rear door of a vehicle, and the vehicle door is a rear door that is and/or can be installed next to rear seat of the vehicle. The vehicle side panel includes a vehicle pillar that serves as the lateral limit of the door opening. The vehicle pillar is in the form of a rear pillar of the vehicle, for example, it is particularly constructed as a C pillar or a D pillar.

The side panel arrangement includes a cladding arrangement and an airbag module. The cladding arrangement is advantageously designed to cover the vehicle pillar, in particular to conceal the vehicle pillar from the perspective of the vehicle interior, and to accommodate and conceal the airbag module. The cladding arrangement is preferably fastened to the vehicle pillar and/or the side panel of the vehicle in positive and/or force-fitting manner, e.g., with screws, rivets or clamps.

The cladding arrangement includes a first cladding element configured to cover the at least one pillar section of the vehicle pillar. The first cladding element is preferably designed to cover part or all of a first, particularly a lower pillar section, wherein the first pillar section is located next to the door opening and/or is immediately adjacent thereto. In particular, the first pillar section is arranged at the same height as a windowless door section of the vehicle door when the vehicle door is fitted in the door opening. In particular, the first pillar section is an adjacent zone with the windowless door section. Optionally, the first cladding element covers and/or conceals the first pillar section. A first end side thereof lies directly flush with the door opening. In this context, particularly the first end side of the first cladding element is fastened to the vehicle pillar, preferably detachably.

The cladding arrangement may optionally further include a second cladding element. The second cladding element is preferably constructed as a molded part from a rigid plastic material. For example, it may be made from a thermoplastic plastic or a thermosetting plastic. The second cladding element is optionally designed to cover at least one further pillar section. In particular, the second cladding element may cover an upper pillar section, wherein the upper pillar section is arranged level with and/or next to a window section of the vehicle door, when it has been fitted in the door opening. In particular, when covering the upper pillar section, the second cladding element the is located laterally adjacent to a window section of the vehicle door that is to be integrated, and/or is arranged at the same height as the window section.

Alternatively or optionally in addition thereto, the second cladding element may also cover a lower pillar section, wherein the lower pillar section is arranged below the upper pillar section, in particular extending towards a vehicle floor. In particular, the lower pillar section is arranged on the same level as a windowless door section of the vehicle door, when the vehicle door has been fitted in the door opening. For example, when covering the lower pillar section the second cladding element is arranged adjacent to the first cladding element and at the same time at a distance from the door opening. Optionally, the first cladding element is arranged between the door opening and the second cladding element when this element covers the lower pillar section.

Alternatively, or optionally in addition to the above, the second cladding element is designed to cover an upper luggage compartment wall section of the vehicle, wherein the upper luggage compartment wall section corresponds to and/or covers an upper side of the wheel arch in the vehicle interior. It is also possible within the scope of the present disclosure for the cladding arrangement to include a third cladding element. The third cladding element is preferably made from a flexible and/or supple base material, e.g., a reinforced fiber base material, particularly a reinforced woven fabric and/or knitted fabric. The third cladding element is designed as a cover for a lower luggage compartment wall section of the vehicle side panel, for example. The lower luggage compartment wall section is preferably arranged below the upper luggage compartment wall section. In particular, the lower luggage compartment wall section is located adjacent to the second cladding element if said second element covers the lower pillar section.

The airbag module of the side panel arrangement includes a gas-inflatable airbag. The airbag module preferably includes a gas generator, that is designed to generate the gas when the airbag module is activated, particularly during and/or after the vehicle is involved in a collision. The airbag module is preferably constructed in the form of a soft pack airbag module, in particular without a housing. The airbag module is designed for example as aside airbag, particularly to protect a passenger in the rear seat if the vehicle is involved in a collision from the side.

The airbag module is preferably arranged adjacent to the door opening, in particular adjacent to the windowless door section of the vehicle door when the door has been fitted in the door opening. In particular, the first cladding element covers and/or conceals the airbag module from the perspective of the vehicle interior. For this purpose, the airbag module is arranged so that it is covered by the first cladding element. In particular, the airbag module is arranged between the vehicle pillar and the first cladding element.

The first cladding element preferably has a length and width that is at least equal to the length and width of the airbag module. This enables the first cladding element to cover the airbag module completely on the side facing the vehicle interior. Optionally, the first cladding element may also have larger external dimensions than the airbag module.

When the airbag module is in the activated state, the airbag unfolds preferably between the vehicle pillar and the rear seat and inflates particularly in the direction of travel of the vehicles along the vehicle door and into the vehicle interior to prevent an impact between the passenger and the vehicle side panel, the vehicle door and/or the vehicle pillar. To this end, when the airbag module is in the activated state the end side of the first cladding element is detached from the door opening, so that an outlet is formed for the airbag as it inflates, and through which the airbag can unfold.

It is advantageous that the end side of the first cladding element is detachable from the door opening, not only because of the flexible base material, but particularly because it is designed as a soft plastic molded part, and the outlet for the expanding airbag can be created without damaging the first cladding element. This make it possible for the first cladding element to be used again after the airbag module has been replaced, thus saving money and labor time. Moreover, damage to the second and/or third cladding elements is also advantageously prevented, which also helps to save the cost of replacing them after the a collision involving the vehicle.

A preferred design variation of the present disclosure provides that the first cladding element forms a cover for the airbag module, particularly in the form of a soft pack airbag module. It is advantageous that the first cladding element not only covers the at least one pillar section and conceals the airbag module, but also functions as the cover for the airbag module. Consequently, the first cladding element fulfills several functions, thus also helping to save costs and reduce installation space in the vehicle interior.

The first cladding element is preferably in the form of a molded part made from a soft plastic base material, an elastomer, for example. It is particularly preferred if the first cladding element is in the form of a molded part, the outer contour and/or shaping of which reflects that of the second cladding element. In particular, the shaping of the first cladding element continues the shaping of the second cladding element and/or complements it. In this way, it may be provided that the cladding arrangement covers the vehicle pillar in a visually appealing manner, and that the transition from the first cladding element to the second cladding element is visually pleasing despite the difference in base materials.

In a preferred embodiment of the present disclosure, the vehicle side panel has a sealing element, which is designed to seal the vehicle door that is to be fitted in the door opening. The sealing element runs around at least sections of the door opening, and preferably around the entire opening.

It is particularly preferred that the end side of the first cladding element is fastened detachably to the vehicle pillar, particularly in the area adjacent to the door opening, more specifically in the area adjacent to the windowless door section, by the sealing element. For example, the sealing element has a sealing lip under which the end side is inserted, so that it is thus fastened detachably in positive and/or force-fitting manner. When the airbag module is in the activated state, the airbag preferably inflates, pressing against first cladding element, which causes the end side to become detached from the fastening, as the end side slides out from behind the sealing lip. The first cladding element preferably only releases very small forces to counteract the inflating airbag because it is made from very flexible and/or bendable material. In particular, the first cladding element is bent up and/or away from the door opening and/or the sealing element by the expanding airbag, thus creating the outlet for the expanding airbag. To be precise, the first cladding element yields in the direction of the second cladding element and so creates the outlet for the expanding airbag.

In a preferred variant of the present disclosure, the first cladding element is fastened to the second cladding element, in particular connected thereto in positive and/or force-fitting manner. The second cladding element preferably includes a fastening means that is designed to provide a positive and/or force-fitting connection with the first cladding element. In particular, the first cladding element may be fastened by retaining it in an interference fit in the fastening means. For example, the fastening means is designed as a longitudinal mounting with an insertion opening for a further end side of the first cladding element, which is preferably positioned opposite the first end side. Alternatively, the fastening means is constructed as a bracket. In particular, the first cladding element is clamped in the fastening means with the further end side. To do this, it is pushed into the longitudinal mounting through the insertion opening together with the further end side. The first cladding element is preferably also held securely in the fastening means when the airbag module is in the activated state. This prevents the first cladding element from being propelled into the vehicle interior as an uncontrolled projectile.

Optionally in addition thereto, at least one remaining end side of the first cladding element is fastened in positive and/or force-fitting manner to the vehicle pillar and/or the vehicle side panel by means of screws, rivets and/or clips. It is advantageous if the first cladding element is retained securely on the vehicle pillar by its attachment to the second cladding element and/or the vehicle pillar and/or the vehicle side panel when the airbag module is in the activated state, and not propelled into the vehicle interior as an uncontrolled projectile.

In a preferred variation of the present disclosure, the first cladding element has a hinge line, about which the first cladding element is pivotable and/or pivots to form the outlet for the inflating airbag when the airbag module is in the activated state. The hinge line is formed by a weakened area in the base material of the first cladding element, for example. The hinge line is preferably located at a distance from the end side, particularly at a distance from the door opening and/or the sealing element. The hinge line is particularly preferably located adjacent to the further end side, more particularly adjacent to the insertion opening of the fastening means. In particular, the hinge line extends parallel and/or in the same direction as the longitudinal extension of the insertion opening. Alternatively, the hinge line is arranged so that it overlaps with the insertion opening. As a result, the first cladding element can be pivoted about the hinge line, out of the fastening and over the sealing element after it is released to create the outlet for the expanding airbag when the airbag module is in the activated state.

In a preferred valiant of the present disclosure, the first and second cladding elements are constructed as a single part, and optionally also from the same material. The first cladding element preferably replaces the second cladding element partly or completely. In particular, the first cladding element replaces the second cladding element with respect to its function of covering the at least one further pillar section and/or the upper luggage compartment wall section. For example, besides covering the first pillar section the first cladding element and not the second cladding element also covers the upper pillar section, the lower pillar section and/or den upper luggage compartment wall section. Alternatively or optionally in addition thereto, the first and third cladding elements are constructed as a single item and optionally also made from the same material. The first cladding element preferably replaces the third cladding element partly or completely with respect to its function of covering the lower luggage compartment wall section. It is also possible within the scope of the present disclosure for the first, second and third cladding elements to be constructed as a single part and optionally also made from the same material.

The first cladding element is particularly preferably designed with a larger area so that it is able to assume part or all of the functions of the second and/or third cladding element(s), in order to be able to cover the sections intended for the second and/or third cladding element(s) as well. Optionally in addition, the first cladding element may replace part or all of a fourth cladding element in respect of the cladding function of the vehicle headliner for example. For this purpose, the first cladding element is preferably constructed from multiple parts and/or includes several individual molded parts. The first cladding element and the fourth cladding element are particularly preferably constructed as a single part, and optionally also made from the same material. It is advantageous that in this variant the second and/or third, and optionally the fourth cladding element as well, can be dispensed with at least partially, which in turn lowers costs for additional shaping tools and/or cutting to size, and the number of components that have to be fitted in the side panel arrangement can be reduced.

As an alternative to creating the outlet by detaching the end side from the door opening, it is suggested within the scope of the present disclosure that the outlet for the inflating airbag be incorporated in the design of the first cladding element. In particular, the first end side of the cladding element is fastened to the vehicle pillar permanently, that is to say such that it cannot be detached without the use of tools and/or without destroying it, particularly in the area of the door opening. This may be assured by the use of a positive and/or force-fitting connection of the first end side by screwing, riveting and/or clamping.

As an alternative to constructing the first cladding element as a soft plastic molded part, in this case it is preferably made from a reinforced fiber material, a woven and/or knitted fabric as the base material. For example, the first cladding element is made from a carpet material, which is also designed to cover the luggage compartment wall or a luggage compartment floor, for example. Alternatively, the first cladding element may be constructed from a textile base material that is designed to cover a vehicle headliner. In the variant using a reinforced fiber material, a woven and/or knitted fabric, it is preferred that the first cladding element creates the outlet for the inflating airbag in said base material by tearing open and/or bursting. In particular, the reinforced fiber material, a woven and/or knitted fabric is torn or burst apart by the force of the inflating airbag.

It is advantageous that only the first cladding element is torn open, while the second and third cladding elements remain undamaged when the airbag module is in the activated state. Moreover, a weakening of the base material is not required to ensure that the base material of the first cladding element bursts or is torn open. Consequently, the manufacturing step for introducing the weakened area and the costs associated therewith can be eliminated.

Alternatively, it is possible within the scope of the present disclosure for the first cladding element to have at least one score line, along which the first cladding element tears open. The at least one score line preferably extends at a distance from the further end side, particularly at a distance from the second cladding element. The at least one score line offers the advantage that the first cladding element tears open in a deliberate manner along the score line, thereby enabling the airbag to expand in the correct direction. In particular, it is also guaranteed that the second cladding element remains undamaged when the airbag is activated. The at least one score line may be created in the form of a weakening in the base material, for example.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. Equivalent or identical parts in the figures are identified with the same reference signs.

Figure 1:
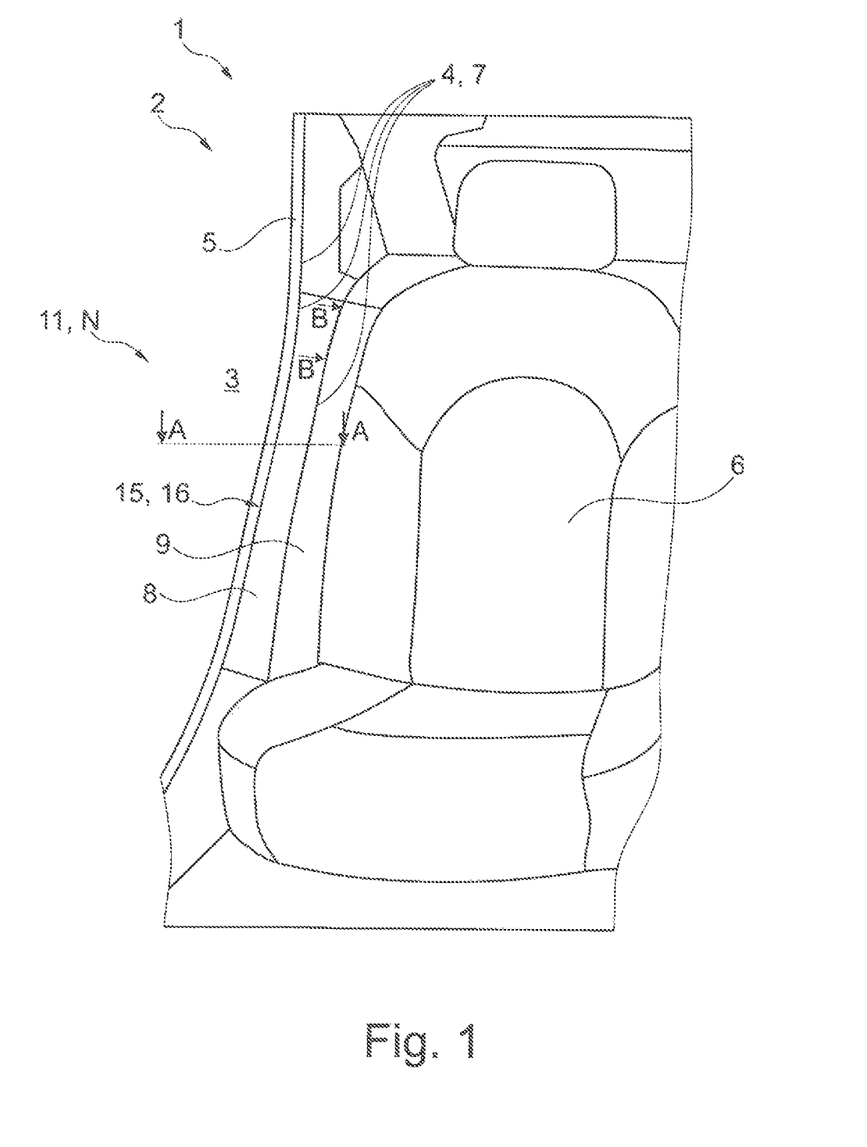
FIG. 1 shows a side panel arrangement for a vehicle having a vehicle side panel and with a vehicle pillar including a cladding arrangement.

FIG. 1 shows a perspective plan view of a side panel arrangement 1 of a motor vehicle, particularly a motor car. Side panel arrangement 1 includes a vehicle side panel 2 with a door opening 3, in which a rear vehicle door of the vehicle may be fitted. Vehicle side panel 2 includes a vehicle pillar 4 that is positioned laterally adjacent to door opening 3. Vehicle pillar 4 has the form of a rear vehicle pillar, a C- or D-pillar of the vehicle, for example. A rear seat 6 is arranged next to vehicle pillar 4, and a passenger reaches said seat by entering the vehicle through door opening 3. Vehicle side panel 2 has a sealing element 5, which runs around the entire door opening 3 and is designed to seal the vehicle door that is to be fitted in door opening 3. Sealing element 5 has a sealing lip 16, which is in contact with the edge area of vehicle pillar 4 and lies flush against and/or on said edge area.

Vehicle pillar 4 has a cladding arrangement 7. Cladding arrangement 7 includes a first cladding element 8 and a second cladding element 9. In particular, first cladding element 8 and second cladding element 9 are designed to cover vehicle pillar 4. First cladding element 8 is arranged adjacent to door opening 3, and second cladding element 9 is located at a distance from door opening 3. In particular, first cladding element 8 is arranged between door opening 3 and second cladding element 9. A first end side 15 of first cladding element 8 borders door opening 3.

First cladding element 8 is constructed as a single-part or a multi-part molded part from a flexible and/or bendable base material, particularly a soft plastic material, e.g., an elastomer. Second cladding element 9 is constructed as a single-part or a multi-part molded part from a rigid base material, e.g., a hard plastic, particularly from a thermosetting plastic or a thermoplastic plastic. The shaping of first cladding element 8 is adapted to replicate and reflect the shaping of second cladding element 9, and/or first cladding element 8 continues the shaping.

An airbag module 11 (FIGS. 3, 5-6) is arranged to be hidden behind first cladding element 8. For this purpose, first cladding element 8 is constructed with such dimensions that it is able to cover airbag module 11 completely. Airbag module 11 has the form of a "soft pack" airbag module, in particular a module without its own airbag module cover. Airbag module 11 includes an airbag 12 and a gas generator 13. Airbag 12 is designed as a side airbag to protect the passenger in rear seat 6 if the vehicle is involved in a collision, particularly a side-on collision.

Figure 2:
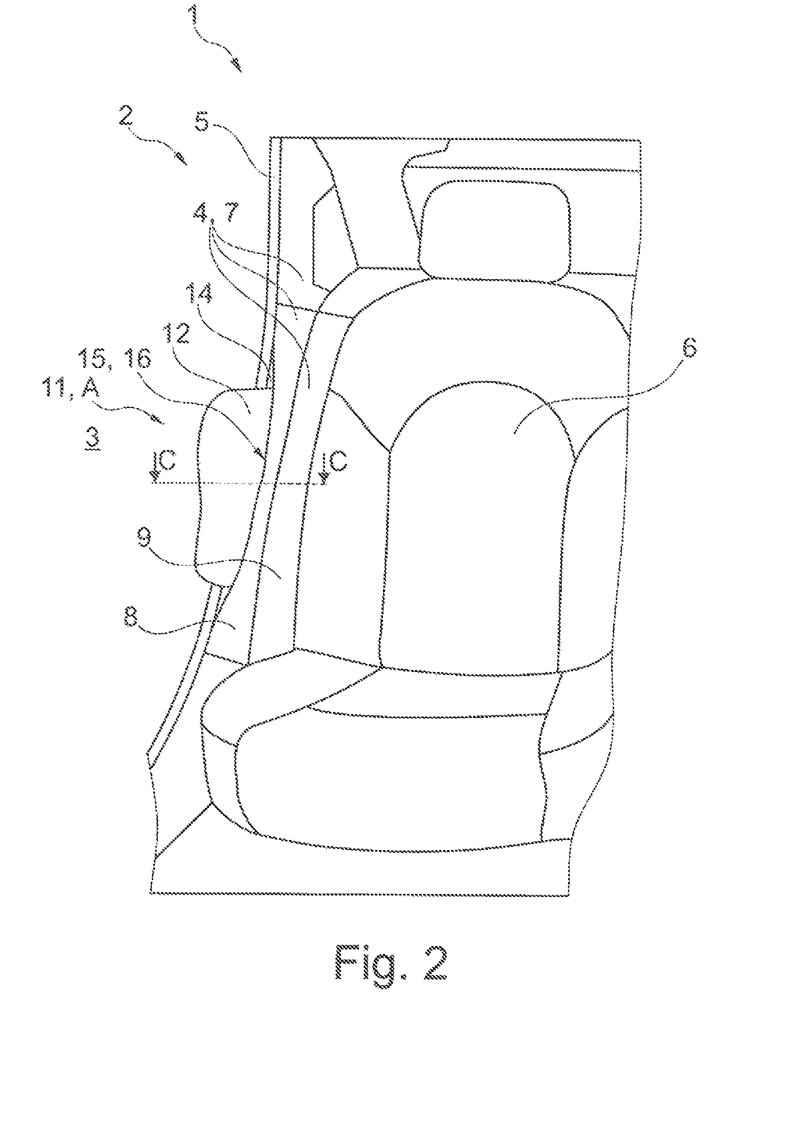
FIG. 2 shows the side panel arrangement of FIG. 1 with the cladding arrangement and with an airbag module in an activated state.

As shown in FIG. 2, airbag module 11 has an activated state A during and/or after the impact, in which state gas generator 13 generates gas and releases it into airbag 12 explosively. The gas flowing into airbag 12 causes airbag 12 to expand through an outlet 14 in cladding arrangement 7, into an interior of the vehicle, thus activating its protective function. Outlet 14 is arranged between door opening 3 and first end side 15 of first cladding element 8. In particular, outlet 14 is formed in an area in which first cladding element 8 borders door opening 3 and/or sealing element 5.

Figure 3:
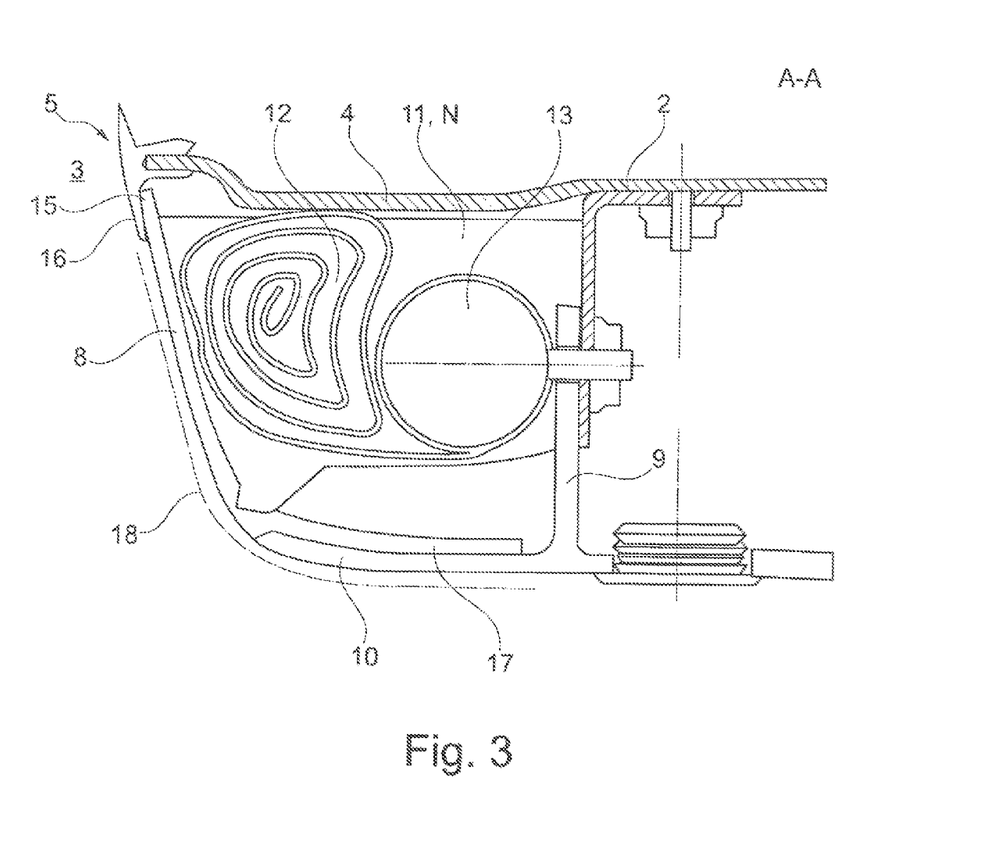
FIG. 3 is a cross sectional view through the side panel arrangement of FIG. 1 along line A-A.

FIG. 3 shows a cross section along line A-A in FIG. 1 through side panel arrangement 1 of FIG. 1. Airbag module 11 is in the non-active state N. It is arranged so that it is hidden behind first cladding element 8, and first cladding element 8 covers airbag module 11. Airbag module 11 is fastened permanently to vehicle side panel 2, in particular to vehicle pillar 4 in positive and/or force-fitting manner, e.g., by screwing, clamping and/or riveting with fastening means 10. Second cladding element 9 is also fastened in positive and/or force-fitting manner to vehicle side panel 2, in particular to vehicle pillar 4, with fastening means 10.

First end side 15 of first cladding element 8 borders door opening 3. In the border area between first cladding element 8 and door opening 3, the first end side 15 is fastened detachably to vehicle pillar 4 n positive and/or force-fitting manner via sealing element 5. In particular, first end side 15 is inserted behind sealing lip 16, so that it is clamped detachably and/or retained detachably between sealing lip 16 and vehicle pillar 4. First cladding element 8 has a second end side 17, which is positioned opposite first end side 15. Second end side 17 is connected to second cladding element 9 via a fastening means 10 (FIG. 4) of second cladding element 9.

Figure 4:
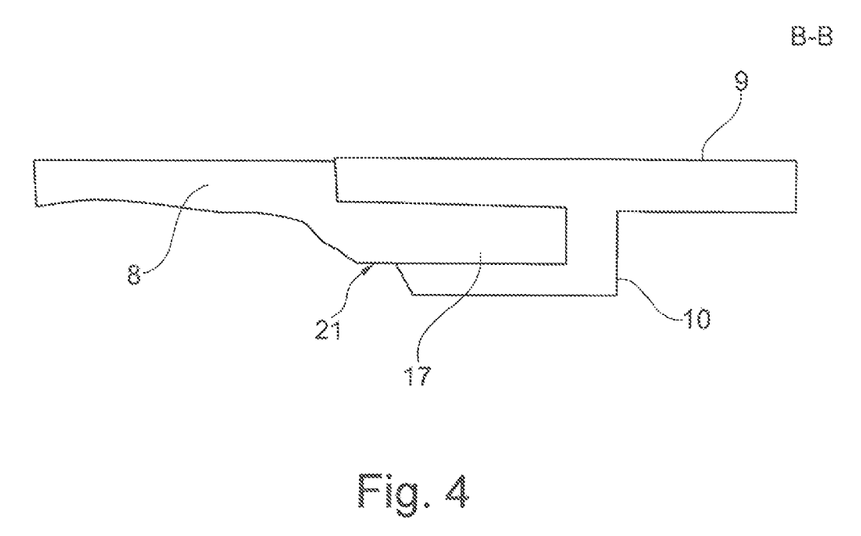
FIG. 4 is a longitudinal view through the side panel arrangement of FIG. 1 along line B-B.

FIG. 4 shows a longitudinal section through cladding arrangement 7 of FIG. 1 along line B-B. This extends in the joint area between first cladding element 8 and second cladding element 9. Second cladding element 9 includes fastening means 10, which is constructed as a longitudinal mounting with an insertion opening 21 for first cladding element 8. First cladding element 8 is inserted in fastening means 10 through insertion opening 21 and clamped inside, so that it is connected to second cladding element 9 in positive and/or force-fitting manner. First cladding element 8 is preferably retained secured even when airbag module 11 is in the activated state A (FIG. 2), so that it cannot become detached from fastening means 10. This prevents first cladding element 8 from being propelled into the vehicle interior in the manner of an uncontrolled projectile when airbag module 11 is in the activated State A if the vehicle is involved in a collision.

In a possible alternative embodiment, first cladding element 8 does become detached from fastening means 10 when airbag module 11 is in the activated state A. First cladding element 8 has a hinge line 18, which is realized as an indentation and/or weakened zone in the base material of first cladding element 8. Hinge line 16 is located at a distance from door opening 3. At the same time, hinge line 16 is arranged next to and/or matches the insertion opening 21 of longitudinal mounting.

Figure 5:
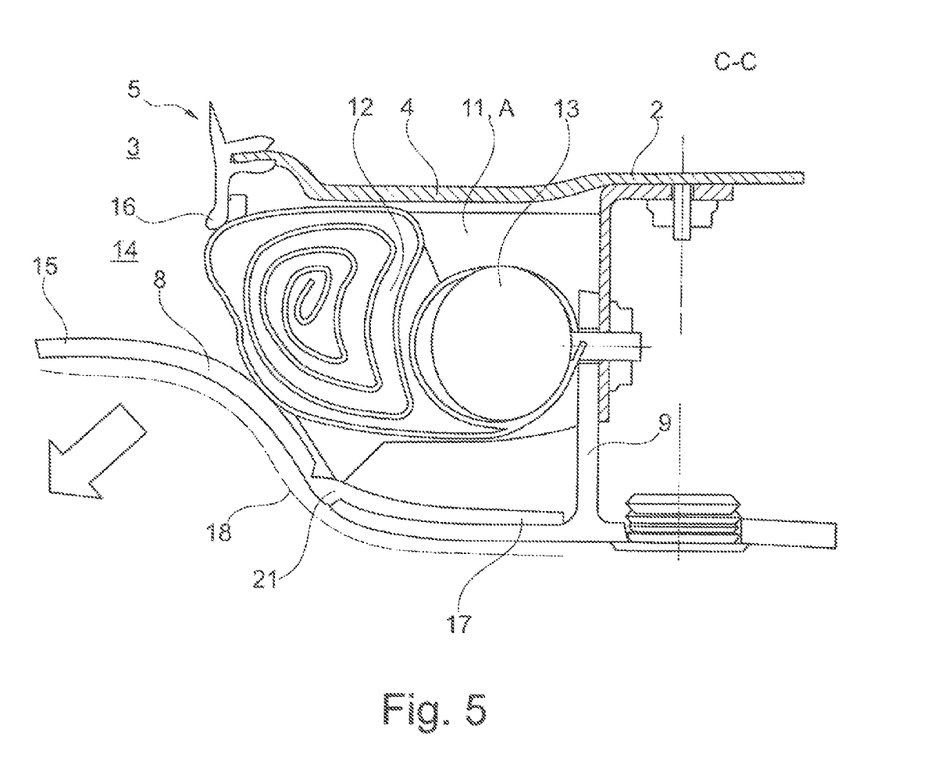
FIG. 5 is a cross sectional view through the side panel arrangement of FIG. 2 along line C-C.

FIG. 5 shows a cross sectional view of side panel arrangement 1 in FIG. 2 along line C-C. Airbag module 11 is in the activated state A. Gas generator 13 generates the gas that enters airbag 12 and inflates airbag 12 explosively. In this process, airbag 12 presses against first cladding element 8 and released it from the detachable fastening arrangement with sealing lip 16. In this context, the first end side 15 of first cladding element 8 is pulled forward between vehicle pillar 4 and sealing lip 16 by the force of inflating airbag 12. First Cladding element 8 pivots about hinge line 18 so that outlet 14 if formed for airbag 12. First Cladding element 8 is retained against second cladding element 9 by means of the fastener in fastening means 10, so that it is not propelled uncontrollably into the vehicle interior. Alternatively, first cladding element 8 can also be released from fastening means 10 and completely detached from cladding arrangement 7 by the forces that are generated when airbag 12 is inflated, and thus form outlet 14. In this case, hinge line 18 is not needed, because first cladding element 8 does not pivot.

Figure 6A:
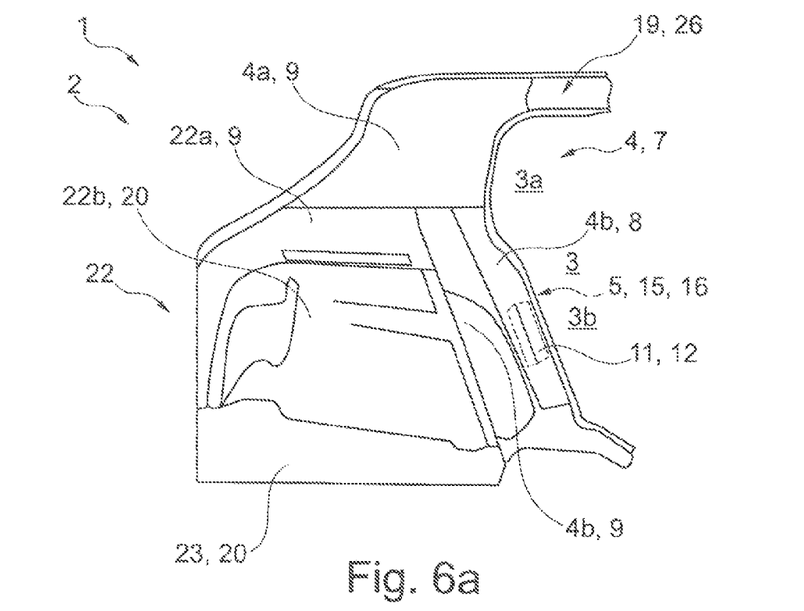
FIGS. 6a-6f are plan views of alternative cladding arrangements with a first, second, third and fourth cladding element.

FIG. 6a is a plan view of an alternative side panel arrangement 1. Side panel arrangement 1 includes vehicle side panel 2 with door opening 3 and with vehicle pillar 4. Vehicle pillar 4 has an upper pillar section 4a and a lower pillar section 4b. Vehicle pillar 4 is adjoined by a luggage compartment wall 22 with an upper luggage compartment wall section 22a and a lower luggage compartment wall section 22b, a luggage compartment floor 23 and a vehicle headliner 19 of side panel arrangement 1.

Side panel arrangement 1 includes cladding arrangement 7 with airbag module 11, with first cladding element 8, second cladding element 9, a third cladding element 20 and a fourth cladding element 25. Airbag module 11 is arranged so that it is concealed behind first cladding element 8 in lower pillar section 4b and adjacent to door opening 3. First Cladding element 8 partially covers lower pillar section 4b.

The first end side 15 of first cladding element 8 forms the border of door opening 3, and it is located in particular adjacent to a windowless door section 3b of the vehicle door to be fitted in door opening 3. A window section 3a adjoins windowless door section 3b and extends upward toward vehicle headliner 19. Window section 3a is located adjacent to upper pillar section 4a. As described in the notes on FIG. 3, first end side 15 is clamped detachably below sealing lip 16 of sealing element 5, and when airbag module 11 is in the activated state A it may be released therefrom so that it can pivot about hinge line 18 to form outlet 14 as shown in FIG. 5.

Second cladding element 9 is in the form of a rigid plastic molded part and covers upper pillar section 4a and upper luggage compartment wall section 22a. Second cladding element 9 also covers the remaining part of lower pillar section 4b that is not covered by first cladding element 8. Second cladding element 9 is located at a distance from door opening 3. In particular, first cladding element 8 is arranged between door opening 3 and second cladding element 9. First and second cladding elements 8; 9 are connected to each other via the fastening means 10 described in FIG. 4.

Third cladding element 20 covers lower luggage compartment wall section 22b and luggage compartment floor 23. Third Cladding element 20 is made from a flexible and/or bendable base material, particularly a preferably reinforced fiber material, a woven fabric and/or knitted fabric. Third cladding element 20 is realized as a carpet, for example. Fourth cladding element 25 conceals vehicle headliner 19 from the viewpoint of the vehicle interior. It is also made from a flexible and/or bendable base material, particularly a preferably reinforced fiber material, a woven fabric and/or knitted fabric. The base material of fourth cladding element 25 is preferably thinner or finer than that of third cladding element 20.

First cladding element 8 is designed as a flexible and/or bendable plastic molded part, as described previously in FIG. 1. Alternatively, first cladding element 8 may be made from an optionally reinforced fiber material and/or an optionally reinforced woven and/or knitted fabric. For example, first cladding element 8 may be made from the same base material as the third or fourth cladding elements 20; 25. In this variant, first cladding element 8 may be fastened detachably in a positive fitting manner via sealing lip 16 as described previously in FIG. 3, and may form outlet 14 for airbag 12 as shown in FIG. 5 by sliding out of the fastening means. Alternatively, it is possible that outlet 14 is created in first cladding element 8. In this context, first cladding element 8 is attached permanently to vehicle pillar 4, that is to say it cannot be detached from the pillar non-destructively. The base material of first cladding element 8 tears and/or bursts preferably centrally in an area of first cladding element 8 and at a distance from the second, third and/or fourth cladding elements 9, 20, 25 due to the action of the force from airbag 12 as it inflates. In order to guarantee that the first cladding element 8 will tear open and/or burst in a defined manner, it may include at least one score line (not shown), which is realized as a weakening of the base material. The score line extends at a distance from the second, third and/or fourth cladding elements 9, 20, 25, particularly centrally in an area of first cladding element 8.

Figure 6B:
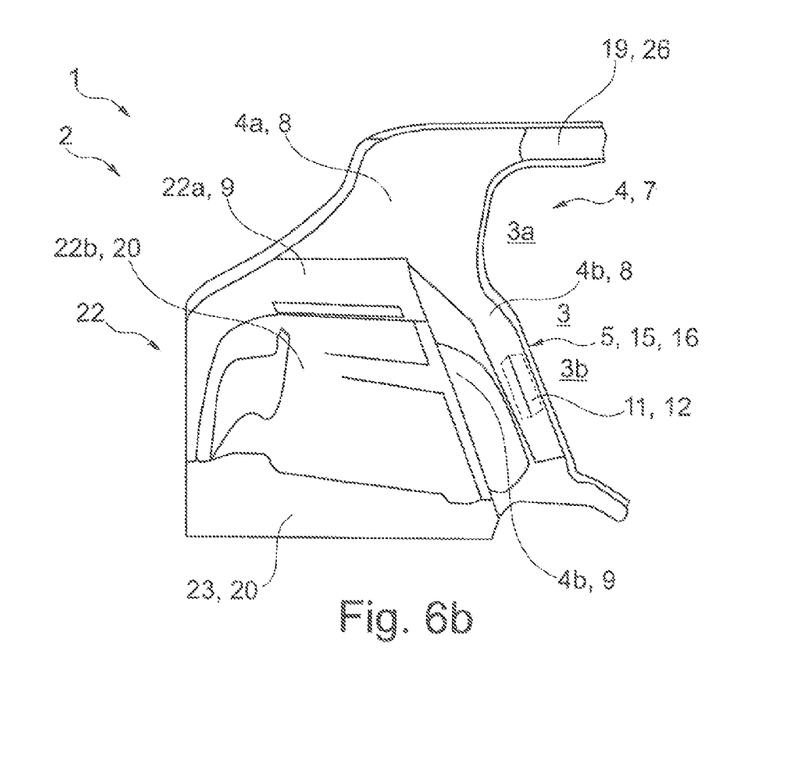

FIG. 6b shows a first variation of the side panel arrangement 1 of FIG. 6a. In general, the description regarding the arrangement, positioning, fastening, composition, base material and function of cladding elements 8, 9, 20, 25 from the description of FIG. 6a may also be applied here. The difference with regard to FIG. 6a lies in the area and arrangement of the first cladding element 8. As in FIG. 6a this covers a portion of the lower pillar section 4b adjacent to the windowless door section 3b, and at the same time as a single-part and/or multiple-part molded part also covers upper pillar section 4a. In particular first cladding element 8 takes over the function of cladding upper pillar section 4a from second cladding element 9.

Figure 6C:
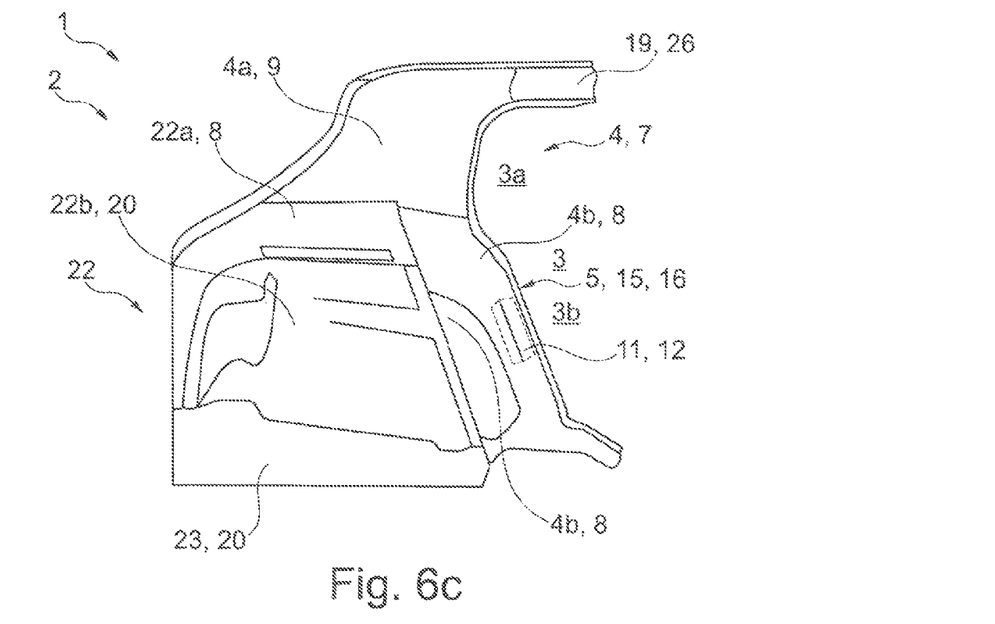

Upper luggage compartment wall section 22a and the subsection of lower pillar section 4b that is adjacent to first cladding element 8 and at a distance from door opening 3 are covered by second cladding element 9, as described in FIG. 6a. In general, it should be noted that first cladding element 8 may be made from the flexible and/or bendable plastic material or from the flexible and/or bendable fiber material, a woven and/or knitted fabric. Alternatively, as shown in FIG. 6c, in a second variation is possible that first cladding element 8 replaces second cladding, element 9 with regard to the second cladding, elements function of covering the partial area of lower pillar section 4b, so that first cladding element 8 covers lower pillar section 4b completely.

Figure 6D:
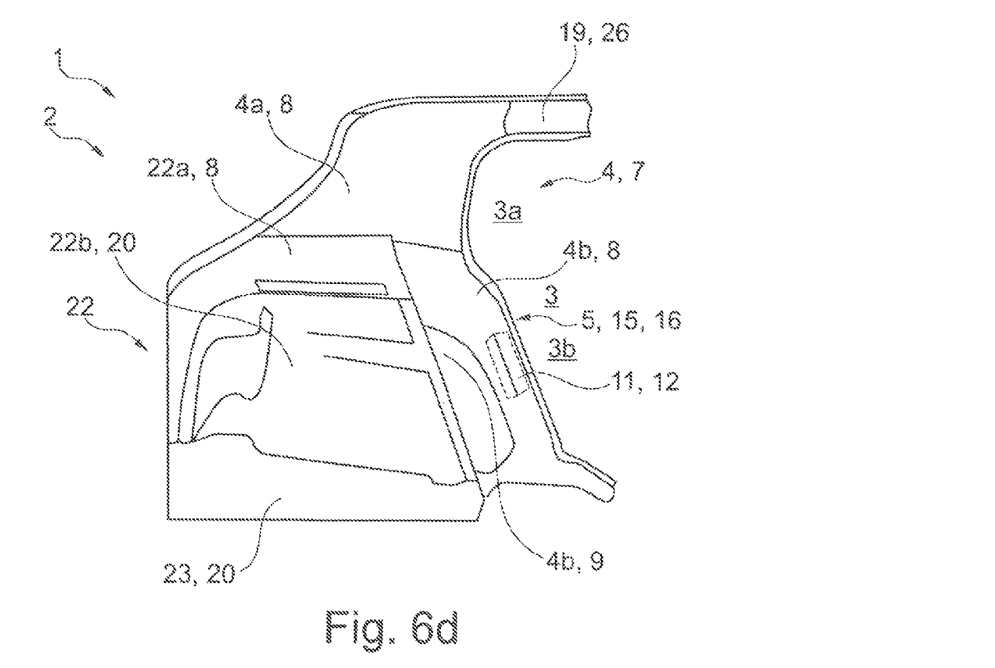

Alternatively or optionally in addition thereto, as shown in a third variation of side panel arrangement 1 according to FIG. 6d, it is possible for first cladding element 8 to replace second cladding element 9 with regard to its function of covering upper Luggage compartment wall section 22a and/or upper pillar section 4a. In this context, first and second cladding elements 8, 9 are constructed as a single part. In particular, it is also possible to dispense with second cladding element 9 entirely.

Figure 6E:
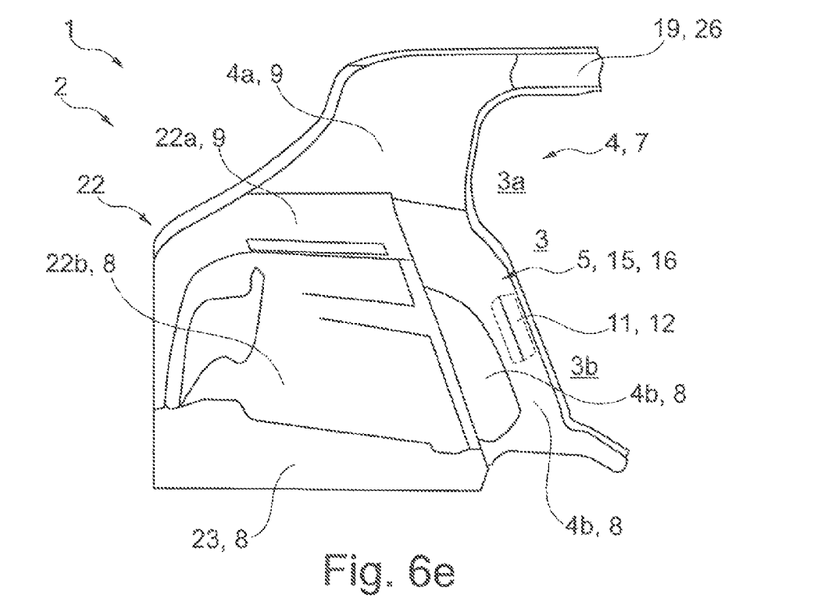

Alternatively or optionally in addition thereto, as shown in a fourth variation according to FIG. 6e, it is possible for first cladding element 8 to replace third cladding element 20 with regard to the third cladding elements function of covering lower luggage compartment wall section 22b and/or luggage compartment floor 23. Thus, it is possible for first cladding element 8 to replace third cladding element 20 partly or even completely. For this purpose, first cladding, element 8 is preferably made from the same carpet material as that of third cladding element 20. First and third cladding elements 8, 9 are also constructed as a single part, and first cladding element 8 made from the carpet material extends from lower luggage compartment wall section 22b, over lower pillar section 4b as far as door opening 3. Optionally in addition thereto, first cladding element 8 also either partially or completely replaces second cladding element 9, as described in FIGS. 6b-6d.

In general, it should be noted in particular that when it is made from the flexible and/or bendable fiber material, a woven and/or knitted fabric, first cladding element 8 itself, forms outlet 14 (FIG. 2) for the inflating airbag 12, in that the base material tears or bursts open, optionally along the at least one score line. Alternatively, the detachable fastening by means of sealing lip 16 is also possible.

In a fifth variation of side panel arrangement 1, it is also possible that first cladding element 8 partly or completely replaces fourth cladding element 25 in respect of its function of covering vehicle headliner 19. For this purpose, first cladding element 8 is preferably made from the same fiber material, a woven and/or knitted fabric as is also used for fourth cladding element 25. Optionally in addition thereto, first cladding element 8 may also replace the second and/or third cladding elements 9; 20 partly or completely, as described previously.

Particularly when it is made from the flexible and/or bendable fiber material, a woven and/or knitted fabric, first cladding element 8 may itself form outlet 14 (FIG. 2) for the inflating airbag 12, in that the base material tears or bursts open, optionally along the at least one score line. Alternatively, the detachable fastening by means of sealing lip 16 is also possible.

Figure 6F:
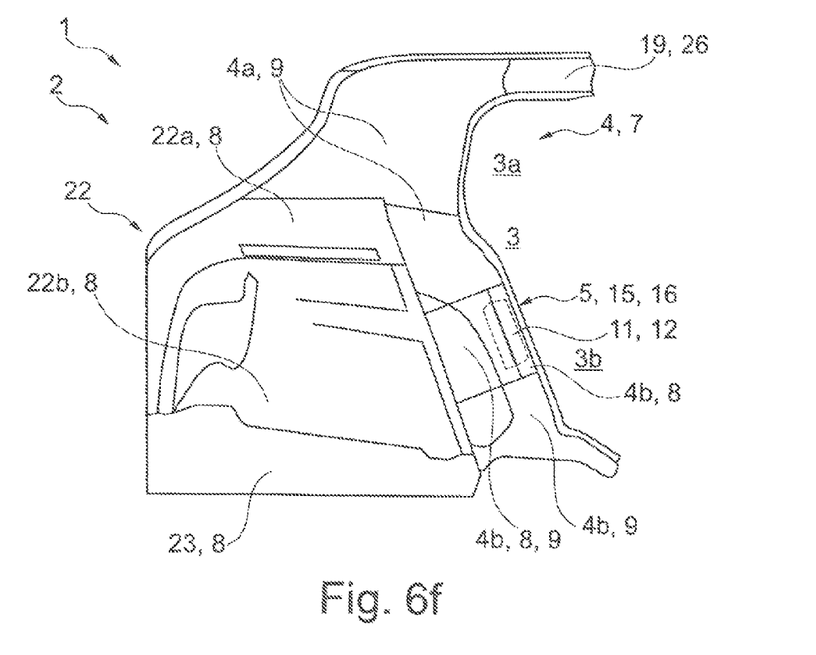

FIG. 6f shows a sixth variation of side panel arrangement 1, in which first cladding element 8 replaces second cladding element 9 in respect of its function of covering upper luggage compartment wall section 22a and third cladding element 20 in respect of its function of covering lower luggage compartment wall section 22b and luggage compartment floor 23. Second cladding element 9 covers lower pillar sections 4b with the exception of the section that aligned adjacent to door opening 3, particularly adjacent to the windowless door section 3b. In this context, first cladding element 8 is arranged to cover airbag module 11 (see also FIG. 3). As a cover for airbag module 11, first cladding element 8 is designed with at least the dimensions of airbag module 11 in terms of length and width, and/or it is adapted to the dimensions of airbag module 11.

Alternatively, particularly when it is made from the fiber base material, a woven and/or knitted fabric it is possible for portions of first cladding element 8 to be arranged below second cladding element 9 in lower pillar section 4b, and to be fastened there for example with fastening means 10 (FIG. 4) or by screwing, riveting and/or clamping. In this context, it is possible that when made from the carpet material, first cladding element 8 extends from lower luggage compartment wall section 22a over lower pillar section 4b to door opening 3, wherein it is mostly covered by second cladding element 9 in lower pillar section 4b. In particular, in lower pillar section 4b first cladding element 8 is only visible as a covering for airbag module 11 and adjacent to windowless door section 3b. Alternatively, particularly when it is made from the carpet material, first cladding element 8 may extend as single part from lower luggage compartment wall section 22a over upper pillar section 4a and over lower pillar section 4b, wherein its is arranged in lower pillar section 4b as an inlay underneath second cladding element 9 and is only visible as the covering for airbag module 11.

It should be stressed that when it is made from fiber base material, a woven and/or knitted fabric, first cladding element 8 may itself form the outlet 14 for the inflating airbag 12, as the base material tears or bursts open, optionally along the at least one score line. Alternatively, the detachable fastening by means of sealing lip 16 is also possible.

Generally, it should be noted with reference to all FIGS. 6a to 6f that first cladding element 8 may be constructed optionally from the flexible and/or bendable plastic material or from the flexible and/or bendable fiber material, a woven and/or knitted fabric. In particular, the detachable fastening of first end side 15 via sealing lip 16 and the pivoting of first cladding element 8 about hinge line 18 as described in FIGS. 3 and 5 may be realized with the flexible and/or bendable properties of first cladding element 8. Alternatively, outlet 14 may be created in the base material of first cladding element 8, when said element tears and/or bursts. In this context, first cladding element 8 is fastened permanently to vehicle pillar 4 and cannot be detached therefrom non-destructively.

Figure 7:
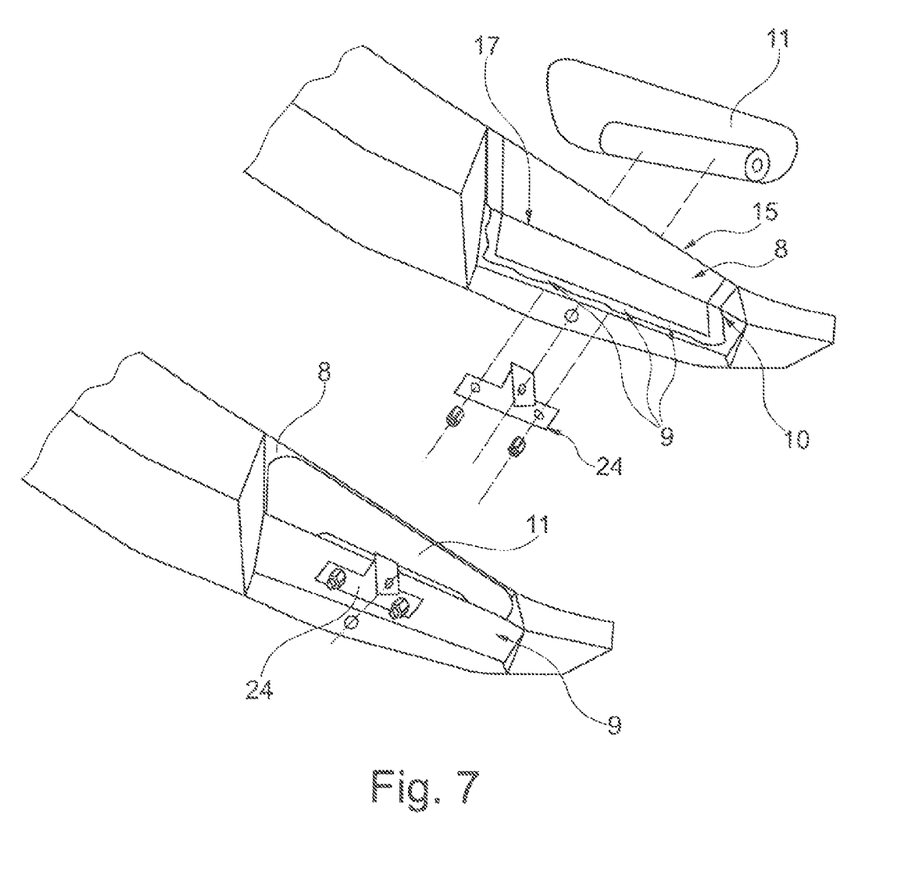
FIG. 7 is an exploded view of the first cladding element, the second cladding element and the airbag module of FIGS. 6a-6f.

An exploded view of first cladding element 8 as a covering for airbag module 11 is shown in FIG. 7. Airbag module 11 has the form of a soft pack airbag module and is fastened to second cladding element 9 without a covering by means of a retaining bracket 24. Second cladding element 9 can be attached securely and permanently to vehicle side panel 2, particularly to vehicle pillar 4, by means of retaining bracket 24.

First cladding element 8 is arranged over airbag module 11 in the manner of a covering. This is preferably achieved using the fastening means 10 of second cladding element 9 shown in FIG. 4 and the means for fastening detachably in positive and/or force-fitting manner via sealing lip 16. Alternatively, the permanent fastening of first cladding element 8 to vehicle side panel 2, particularly to vehicle pillar 4 in positive and/or force-fitting manner by screwing, riveting and/or clamping, which cannot be released non-destructively, is also possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A side panel arrangement for a vehicle having a vehicle side panel including a door opening and a vehicle pillar defining a lateral boundary of the door opening, wherein the side panel arrangement comprises:
an airbag module having an inflatable airbag; and
a cladding arrangement configured to cover the vehicle pillar, the cladding arrangement having a first cladding element made of a flexible material and configured to cover at least one pillar section of the vehicle pillar such that the inflatable airbag is concealed in the vehicle side panel and a second cladding element that is separate from the first cladding element, wherein a first edge of the first cladding element is located adjacent to the door opening and detachably fastened to the vehicle pillar such that the first edge is detached from the vehicle pillar when the airbag module is in an activated state so that an outlet is created for an inflating airbag, and a second edge of the first cladding element is fastened to the second cladding element;
wherein the first cladding element comprises a hinge line about which a portion of the first cladding element is pivotable to form the outlet for the inflating airbag when the airbag module is in the activated state.

2. The side panel arrangement according to claim 1, wherein the outlet is at least partially created in a base material of the first cladding element for the inflating airbag.

3. The side panel arrangement according to claim 1, further comprising a sealing element configured to seal a vehicle door fitted in the door opening, wherein the first edge is configured to be detachably fastened to the vehicle pillar via the sealing element.

4. The side panel arrangement according to claim 1, wherein the first cladding element forms a cover for the airbag module.

5. The side panel arrangement according to claim 1, wherein the first cladding element is a molded part formed from a flexible plastic material.

6. The side panel arrangement according to claim 1, wherein the second cladding element is configured to cover at least one of a further pillar section of the vehicle pillar and an upper luggage compartment wall section of the vehicle, wherein the second cladding element is a molded part formed from a rigid plastic material.

7. The side panel arrangement according to claim 6, wherein the first cladding element comprising a molded part shaped to correspond with a contour of the second cladding element.

8. The side panel arrangement according to claim 7, wherein the first cladding element is shaped to complement the contour of the second cladding element.

9. The side panel arrangement according to claim 6, wherein the second cladding element comprises a fastener for connecting the first cladding element and the second cladding element in positive manner, wherein the fastener comprises a longitudinal mounting having an insertion opening receiving the second edge of the first cladding element, wherein the second edge is disposed opposite the first edge and is configured to be pushed into the insertion opening and clamped in the longitudinal mounting in a force-fitting manner retaining the first cladding element to the second cladding element solely as a result of insertion of the second edge into the insertion opening.

10. A side panel arrangement for a vehicle having a vehicle side panel including a door opening and a vehicle pillar defining a lateral boundary of the door opening, wherein the side panel arrangement comprises:
  an airbag module having an inflatable airbag; and
  a cladding arrangement configured to cover the vehicle pillar, the cladding arrangement having:
    a first cladding element made of a flexible material and configured to cover at least one pillar section of the vehicle pillar such that the inflatable airbag is concealed in the vehicle side panel, wherein a first edge of the first cladding element is located adjacent to the door opening and detachably fastened to the vehicle pillar such that the first edge is detached from the vehicle pillar when the airbag module is in an activated state so that an outlet is created for an inflating airbag;
    a second cladding element configured to cover at least one of a further pillar section of the vehicle pillar and an upper luggage compartment wall section of the vehicle, wherein the second cladding element is a molded part formed from a rigid plastic material; and
    a fastener for connecting the first cladding element and the second cladding element in positive manner, wherein the fastener comprises a longitudinal mounting having an insertion opening receiving a second edge of the first cladding element, wherein the second edge is pushed into the insertion opening and clamped in the longitudinal mounting.

11. The side panel arrangement according to claim 6, wherein the cladding arrangement comprises a third cladding element configured to cover a lower luggage compartment wall section of the vehicle side panel, wherein the first cladding element and the third cladding element are constructed as a single part.

12. The side panel arrangement according to claim 1, wherein the cladding arrangement further comprises a fastener for connecting the first cladding element and the second cladding element in positive manner, the fastener including a longitudinal mounting having an insertion opening receiving the second edge of the first cladding element, wherein the second edge is pushed into the insertion opening and clamped in the longitudinal mounting, wherein the second cladding element is a molded part formed from a rigid plastic material and configured to cover at least one of a further pillar section of the vehicle pillar and an upper luggage compartment wall section of the vehicle, wherein the hinge line is arranged at a distance from the first edge and is positioned at the insertion opening.

13. The side panel arrangement according to claim 1, wherein the first cladding element comprises at least one of a fiber material part, a woven fabric part or knitted fabric part.

14. A side panel arrangement for a vehicle having a vehicle side panel including a door opening and a vehicle pillar defining a lateral boundary of the door opening, wherein the side panel arrangement comprises:
  an airbag module having an inflatable airbag; and
  a cladding arrangement configured to cover the vehicle pillar, the cladding arrangement having a first cladding element made of a flexible material and configured to cover at least one pillar section of the vehicle pillar such that the inflatable airbag is concealed in the vehicle side panel and a second cladding element that is separate from the first cladding element, wherein a first edge of the first cladding element is located adjacent to the door opening and detachably fastened to the vehicle pillar such that the first edge is detached from the vehicle pillar when the airbag module is in an activated state so that an outlet is created for an inflating airbag, and a second edge of the first cladding element is fastened to the second cladding element;
  wherein the first cladding element comprises at least one score line configured to tear open and form the outlet for the inflating airbag when the airbag module is in the activated state.

\* \* \* \* \*